United States Patent [19]

Komatsu et al.

[11] Patent Number: 5,732,276
[45] Date of Patent: Mar. 24, 1998

[54] MACHINE TRANSLATION DEVICE

[75] Inventors: Takako Komatsu; Shinichi Doi; Kazuhiko Hamada, all of Tokyo, Japan

[73] Assignee: NEC Corporation, Tokyo, Japan

[21] Appl. No.: 511,148

[22] Filed: Aug. 4, 1995

[30] Foreign Application Priority Data

Aug. 4, 1994 [JP] Japan .................... 6-182689

[51] Int. Cl.$^6$ .................................................. G06F 17/28
[52] U.S. Cl. ...................................... 395/751; 395/755
[58] Field of Search ................................ 395/751, 752, 395/753, 754, 755, 803

[56] References Cited

U.S. PATENT DOCUMENTS

| | | | |
|---|---|---|---|
| 4,964,044 | 10/1990 | Kumano et al. | 395/752 |
| 5,091,876 | 2/1992 | Kumano et al. | 340/723 |
| 5,214,583 | 5/1993 | Miike et al. | 395/752 |
| 5,220,503 | 6/1993 | Suzuki et al. | 364/226.4 |
| 5,349,368 | 9/1994 | Takeda et al. | 345/115 |
| 5,485,372 | 1/1996 | Golding et al. | 395/795 |
| 5,497,319 | 3/1996 | Chong et al. | 395/600 |
| 5,535,120 | 7/1996 | Chong et al. | 395/803 |
| 5,615,378 | 3/1997 | Nishino et al. | 395/754 |
| 5,617,314 | 4/1997 | Zhong | 395/803 |

FOREIGN PATENT DOCUMENTS 6-150069 7/1986 Japan .
4-367073 12/1992 Japan .

*Primary Examiner*—Gail O. Hayes
*Assistant Examiner*—Frantzy Poinvil
*Attorney, Agent, or Firm*—Foley & Lardner

[57] ABSTRACT

A system for helping the production of a desired translation by aiding the operator to make revisions within the text results of each stage of the translation process. The system achieves this goal by receiving text inputted by the operator and conferring IDs to each character of text, and for this text, successively proceeding through morphological analysis, conferring of equivalents to content words, and conversion of sentence structure to that of the target language while referring to a dictionary/grammar section and conferring IDs to corresponding language units. Text corresponding to each stage is stored and moreover, the stage to which translation has advanced is detected, and upon receiving a designation as to which translation stage the operator wishes to have displayed, outputted text of the translation process designated by the operator is copied from the corresponding buffer if the most advanced translation process at that time is beyond the designated translation stage. If the operator here designates a portion of this text, the buffer of the display stage designated by the operator is referred to, and the corresponding portion is copied and displayed.

5 Claims, 6 Drawing Sheets

MACHINE TRANSLATION DEVICE

BACKGROUND OF THE INVENTION

1. Field of the Invention

The present invention relates to a machine translation device.

2. Description of the Related Art

As a method of post-editing mistranslated text in machine translation devices of the prior art, techniques have been achieved whereby original text and translated text are displayed, and by indicating specific portions of the translated text, the operator can have only those text elements within the original text that correspond to the indicated text displayed in reverse display.

Another technique has been proposed whereby, when a translation takes more than a prescribed amount of time, content words or phrases in the original text are presented to the operator as text in an intermediate stage of translation to the target language (refer to Japanese Patent Laid-open No. 150069/86).

Techniques have also been proposed in which retranslation is carried out after editing original text or designating translation equivalents in order that a desired translation can be easily derived, or in which an intermediate structure is presented and retranslation is carried out after editing to ensure a desired translation (refer to Japanese Patent Laid-open No. 367073/92).

Of the above-described techniques of the prior art, in those techniques for aiding editing of mistranslated text in which the translated text and the original text are displayed and original text-to-target language text correspondences are established, the operator must repeatedly read the original text and target language text one after the other to understand the contexts of both the original text and the translated text for which correspondences were established. Moreover, translated text in which various errors have been compounded over a diversity of translation processing steps must be read and analyzed to determine the type of processing errors that have occurred and the translation processing stages at which these errors have occurred.

In techniques whereby text is presented to the operator at an intermediate stage of translation, the operator checks the appropriateness of translation selections which are given in a structure unchanged from that of the original text, and although new selections can be requested if these selections are inappropriate, the new selections of translated text may result in changes in other portions of the translated text. Further, editing certain portions in the original text make it difficult for the operator to fully grasp how translation results will change for those portions.

In methods whereby translations are designated from original text, translated text, or intermediate stages of translation, although the translation conferred for the portion in question can be grasped, the translation designation may have repercussions on other portions of the translation, changing appropriate translations in other portions to inappropriate translations or changing the sentence structure of the translation, and complicating comprehension of translation results.

In techniques whereby intermediate structures are edited and retranslated, the operator can reliably grasp translation results, but these results can only be obtained by an operator having specialized knowledge regarding the content of intermediate structures.

SUMMARY OF THE INVENTION

The object of the machine translation device of the present invention is to display text in various translation processing stages according to the operator's instructions, such as original text, text in which only content words have been replaced by target language equivalents while maintaining the original text structure, or translated text.

In addition, for text being checked, the machine translation device according to the present invention allows display of information on other translation processing stages regarding a particular portion of text while maintaining without change information for that particular translation processing stage for other portions of the text.

Further, editing of a particular portion within the text causes no repercussions to other portions of text.

By means of these functions, an operator can view the processing results for each translation process and discover the translation step in which a translation error has originated.

An operator can save time when reading and comparing the text in question with other portions of text when dealing with a word or a structure modification.

The object of the present invention is to enable correction only of an inappropriately translated portion while maintaining unchanged appropriately translated text in other portions.

In order to solve the above-described problems, the machine translation device of the invention comprises:

a text input section that receives text inputted by an operator, confers an ID to each character of text, outputs the result, and sends an input process completed signal;

an input text buffer that stores text inputted from the text input section;

a dictionary/grammar section which is a language dictionary and grammar;

a morphological analysis section that refers to the dictionary/grammar section and copies text stored by the input text buffer, carries out morphological analysis while conferring IDs accompanying characters within this text on corresponding morphemes, outputs the result, and sends a process completed signal;

a morphological analysis completed text buffer that stores text outputted by the morphological analysis section;

a translation equivalent conferring section that refers to the dictionary/grammar section, copies text stored by the morphological analysis completed text buffer, replaces each morpheme in the text which is an content word with a target language equivalent while conferring on the equivalent IDs accompanying each morpheme, outputs the result, and sends a process completed signal;

a translation equivalent conferred text buffer that stores text outputted by the translation equivalent conferring section;

a structure conversion section that refers to the dictionary/grammar section; copies text in the translation equivalent conferred text buffer; replaces items among original language auxiliaries within this text having independent target language equivalents with the target language equivalents while conferring on the equivalents IDs accompanying said auxiliaries; for items lacking independent translation equivalents, confers accompanying IDs to the associated independent translation equivalents and drops the original language auxiliaries; converts whole sentences to the target language sentence structure and outputs the result; and sends a process completed signal;

a structure conversion completed text buffer that stores text outputted by said structure conversion section;

a translation stage control section that receives process completed signals sent by the text input section, the morphological analysis section, the translation equivalent conferring section, and the structure conversion section; identifies which translation stage inputted text has reached among text input, morphological analysis following text input, conferring of independent translation equivalents following morpheme analysis, and structure conversion following conferring of independent translation equivalents; and sends an instruction to execute processing to the succeeding processor;

a display stage designation section that accepts the operator's designations regarding for which stage of translation of inputted text is to be displayed;

a current buffer that receives and holds transmitted text;

a display section that displays the content of the current buffer;

a range designation section that accepts the operator's designation of a range A of partially processed text in the current buffer as well as an instruction for partial processing of that range; and directs the buffer control section according to this designation and instruction; and a buffer control section that refers to the translation stage control section and the display stage designation section; copies to the current buffer either the content of the buffer storing the most recent translation process results or the content of one of the morphological analysis completed text buffer, the translation equivalent conferred text buffer, and the structure conversion completed text buffer in which processing has already been completed and which is the process stage designated by the operator; consults IDs of range A of text of the current buffer designated by the operator in the range designation section; and consulting the display stage designation section, searches for range B having the same IDs as range A from the buffer storing text of the translation stage designated in the display stage designation section; and copies range B over range A.

The above and other objects, features, and advantages of the present invention will become apparent from the following description based on the accompanying drawings which illustrate examples of preferred embodiments of the present invention.

BRIEF DESCRIPTION OF THE DRAWINGS

FIGS. 2A–2d an example of text held in the machine translation device of the present invention;

DETAILED DESCRIPTION OF THE PREFERRED EMBODIMENTS

Figure 1:
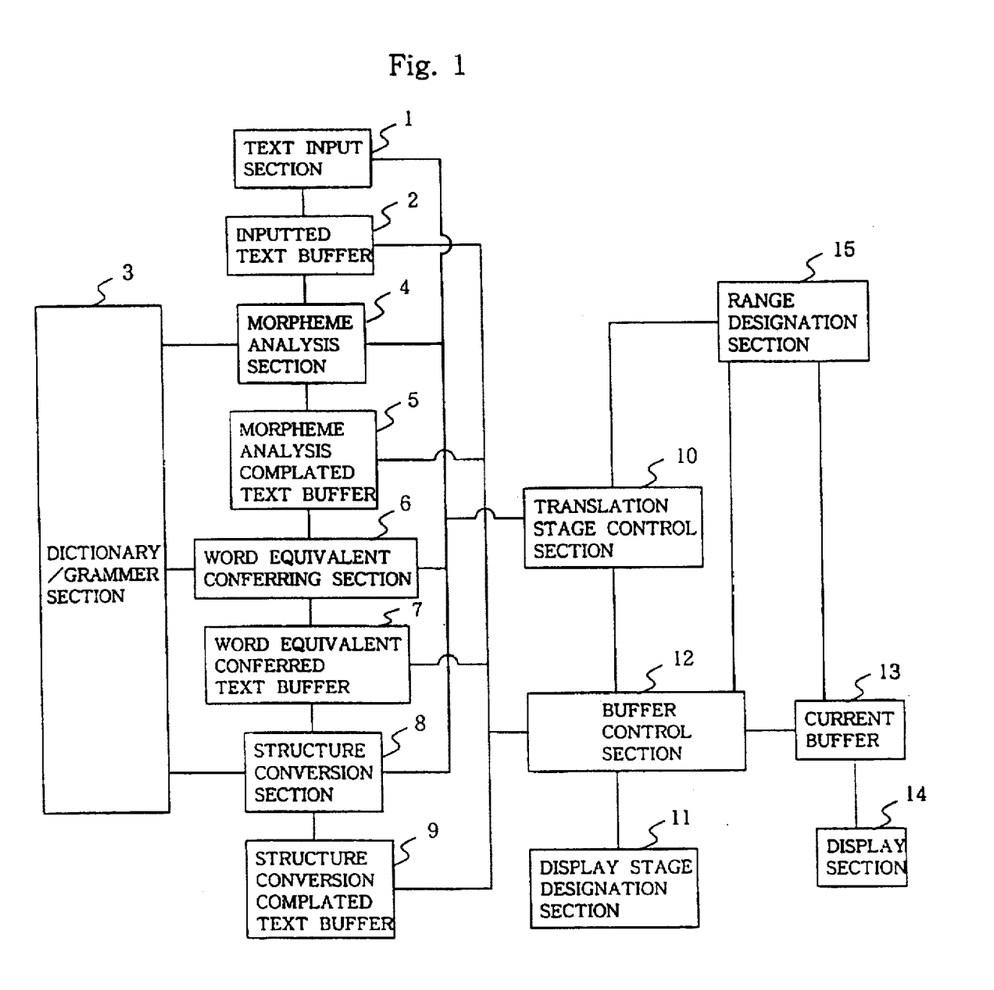
FIG. 1 is a block diagram showing the configuration of the first embodiment of the present invention.

FIG. 1 is a block diagram showing the configuration of the first embodiment of the machine translation device of the present invention. This embodiment is provided with text input section 1, inputted text buffer 2, dictionary/grammar section 3, morphological analysis section 4, morphological analysis completed text buffer 5, translation equivalent conferring section 6, translation equivalent conferred text buffer 7, structure conversion section 8, structure conversion completed text buffer 9, translation stage control section 10, display stage designation section 11, buffer control section 12, current buffer 13, display section 14, and range designation section 15.

FIG. 2(a)–FIG. 2(d) shows examples of text stored in the following components of the machine translation device of the present invention: inputted text buffer 2, morphological analysis completed text buffer 5, translation equivalent conferred text buffer 7 in which equivalents have been conferred to content words, and structure conversion completed text buffer 9 for which conversion of sentence structure to that of the target language has been completed.

Figure 2:
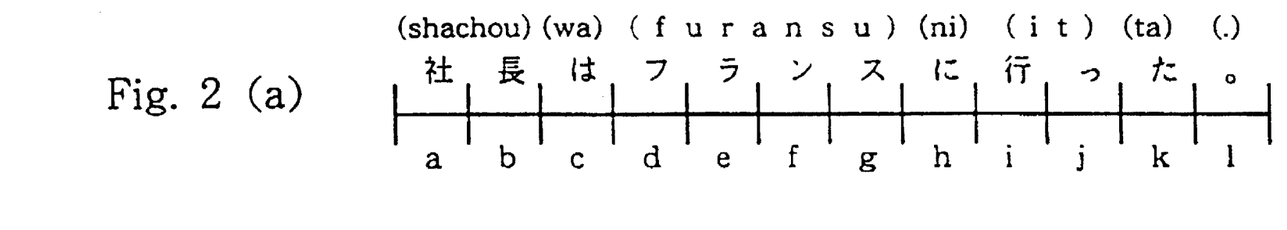

Referring to FIG. 2, an ID for each character held in inputted text buffer 2 is assigned to a corresponding language element in each of the other buffers. The present embodiment will next be explained with reference to FIG. 1.

First, the operator inputs text into text input section 1. Text input section 1 accepts this text, assigns an ID to each character of text and outputs the result, and sends a process completed signal for input. This outputted text is received and stored by inputted text buffer 2.

Next, morphological analysis section 4 refers to dictionary/grammar section 3, which is a language dictionary and grammar, copies the text stored in inputted text buffer 2, analyzes morphemes while assigning ID accompanying characters in the text to corresponding morphemes and outputs the result, and sends a process completed signal. This outputted text is stored in morphological analysis completed text buffer 5.

Next, translation equivalent conferring section 6 refers to dictionary/grammar section 3, copies text stored in morphological analysis completed text buffer 5, converts morphemes of this text which are content words to equivalents in the target language while conferring to the equivalents IDs for each morpheme and outputs the result, and sends a process completed signal. This outputted text is stored in the translation equivalent conferred text buffer 7. Structure conversion section 8 then refers to dictionary/grammar section 3, copies the text in the translation equivalent conferred text buffer 7, converts those original language auxiliaries within this text having independent equivalents to the target language while conferring on these equivalents IDs of the auxiliaries, and for auxiliaries not having independent equivalents, confers the IDs accompanying these auxiliaries to the associated independent translation equivalents and drops the original auxiliaries, converts the overall text to the structure of the target language and outputs the result, and sends a process completed signal. This outputted text is stored in structure conversion completed text buffer 9.

Translation stage control section 10 receives the process completed signals sent by text input section 1, morphological analysis section 4, translation equivalent conferring section 6, and structure conversion section 8, and holds the stage within the translation process to which the inputted text has progressed among text input, followed by morphological analysis, followed by conferring of equivalents to content words, followed by structure conversion, and transmits instructions to execute processing to the processor of the succeeding process.

On the other hand, display stage designation section 11 accepts the operator's request to view text that corresponds to a particular stage of translation processing of inputted text. Buffer control section 12 then refers to translation stage control section 10 and display stage designation section 11, and copies to current buffer 13 either the content of the buffer storing the most recent translation process results or the content of the buffer of a processing stage from among morphological analysis completed text buffer 5, translation equivalent conferred text buffer 7, and structure conversion completed text buffer 9 for which processing has been completed and which the operator has designated.

Current buffer 13 holds the copied content, and the content of this current buffer 13 is displayed on display section 14.

Next, in range designation section 15, the operator designates a range A of text of current buffer 13 and instructs a partial processing of this range. Range designation section 15 receives the range designation and partial processing instruction and directs the designation and instruction to buffer control section 12. Buffer control section 12 refers to the IDs of range A of text in current buffer 13 designated by the operator at range designation section 15, refers to display stage designation section 11, searches range B having the same IDs as range A from the buffer in which text is stored that is of the translation stage designated at display stage designation section 11, and copies range B over range A.

For example, the text sample "Shachou wa furansu ni itta." is inputted from text input section 1. Note: "Shachou" means "president" in Japanese. "wa" is a topic-marking postpositional particle in Japanese. "furansu" means "France" in Japanese. "ni" is a goal-case-marking postpositional particle in Japanese. "itta" includes the meanings "visited" and "flew" in Japanese.

The text input may be made successively or by file input. Text input section 1 outputs this text to input text buffer 2, and sends an input process completed signal to translation stage control section 10. Input text buffer 2 then stores the text.

Next, translation stage control section 10 sends an execute process instruction to morphological analysis section 4. Morpheme analysis section 4 receives this instruction, refers to the text "Shachou wa furansu ni itta." stored in input text buffer 2, executes morphological analysis of this text while referring to dictionary/grammar section 3, outputs the resulting text "/Shachou/wa/furansu/ni/it/ta/./" to morphological analysis completed text buffer 5, and sends a process completed signal to translation stage control section 10.

Morpheme analysis completed buffer 5 stores the outputted text. Translation stage control section 10 receives the process completed signal from morphological analysis section 4, and sends an instruction to translation equivalent conferring section 6 to execute processing. Word equivalent conferring section 6 receives this instruction, refers to the text stored in morphological analysis completed text buffer 5, confers equivalents to content words within this text while referring to dictionary/grammar section 3, outputs as a result "The president wa France ni fly ta." to translation equivalent conferred text buffer 7, and sends a process completed signal to translation stage control section 10. Word equivalent conferred text buffer 7 then stores this text.

Translation stage control section 10 receives the process completed signal from translation equivalent conferring section 6 and sends an instruction to execute processing to structure conversion section 8. Structure conversion section 8 receives this instruction, refers to the text "The president wa France ni fly ta." stored by translation equivalent conferred text buffer 7, drops unnecessary auxiliaries from this text while referring to dictionary/grammar section 3, converts the sentence structure to the sentence structure of the target language, produces the translated text "The president flew to France.", outputs to structure conversion completed text buffer 9, and sends a process completed signal to translation stage control section 10. Structure conversion completed text buffer 9 then stores this text.

Meanwhile, display stage designation section 11 accepts instructions from the operator regarding which stage of the completed translation process text is to be displayed: inputted text, morphological analysis completed text, translation equivalent conferred text, or structure conversion completed text.

Buffer control section 12 refers to translation stage control section 10 to check which stage of the translation process has been completed for the inputted text, morphological analysis, conferring of equivalent words, or structure conversion; and refers to display stage designation section 11 to check for which translation stage the operator has designated display of text. When processing has been completed to the translation stage designated by the operator, buffer control section 12 then copies to current buffer 13 the content of inputted text buffer 2, morpheme analysis completed text buffer 5, translation equivalent conferred text buffer 7, or structure conversion completed text buffer 9 that stores the text of the designated translation stage.

When no translation stage has been designated at display stage designation section 11 or when the translation process has not been completed to the translation stage designated by the operator, buffer control section 12 refers to translation stage control section 10, and as a default, copies to current buffer 13 the content of the buffer storing text that has reached the most advanced translation stage. Display section 14 displays the content of current buffer 13.

For example, if current buffer 13 copies the content of structure conversion completed text buffer 9 and "The president flew to France." is displayed, and the operator instructs the display of text completed only as far as conferring of equivalents to content words, buffer control section 12 refers to translation equivalent conferred text buffer 7 that stores text completed only as far as the conferring of equivalents to content words and copies the content "The president wa France ni fly ta." to current buffer 13. As a result, the text "The president wa France ni fly ta." is displayed.

Alternatively, if the operator instructs the display of text for which only morphological analysis has been completed, buffer control section 12 refers to morphological analysis completed text buffer 5 which stores text for which morphological analysis has been completed and copies the content "/Shachou/wa/furansu/ni/it/ta/./" to current buffer 13, and this text is accordingly displayed.

If only conferring of equivalents to content words has been completed, the content of translation equivalent conferred text buffer 7 is copied to current buffer 13, and "The president wa France ni fly ta." is displayed. In this case, if the operator instructs the display of text for which morphological analysis has been completed, "/Shachou/wa/furansu/ni/it/ta/./" is copied to current buffer 13 by means of buffer control section 12, and this text is displayed by display section 14.

Here, if the operator designates the range "shachou" at range designation section 15 and designates the translation process stage in which only conferring of equivalents to content words has been completed, buffer control section 12 refers to IDs a and b that hold "shachou", refers to translation equivalent conferred text buffer 7, and copies the words "The president" having IDs a and b in translation equivalent conferred text buffer 7 to replace "shachou" of current buffer 13. As a result, "The president/wa/furansu/ni/it/ta/." is displayed.

In this way, the operator is able to refer to any stage from among the results of morphological analysis of the original text, selections of equivalents at the time of conferring equivalents to content words or phrases, or structure conversions upon conversion of sentence structures to translated sentences.

In addition, because information for other portions of the text is held unchanged, the operator can refer to the processing results of other translation stages regarding a portion within the text at any stage of translation processing.

In this way, the operator can focus on only morphological analysis, conferring of equivalents, or structure conversion to judge the appropriateness of a translation process. The operator is also able to easily discover the type of process and the intermediate point in a translation that causes an inappropriate translation result.

In addition, correspondences can more easily be found between words and sentence structure of the original text and equivalent words and structures of the translated text.

Figure 3:
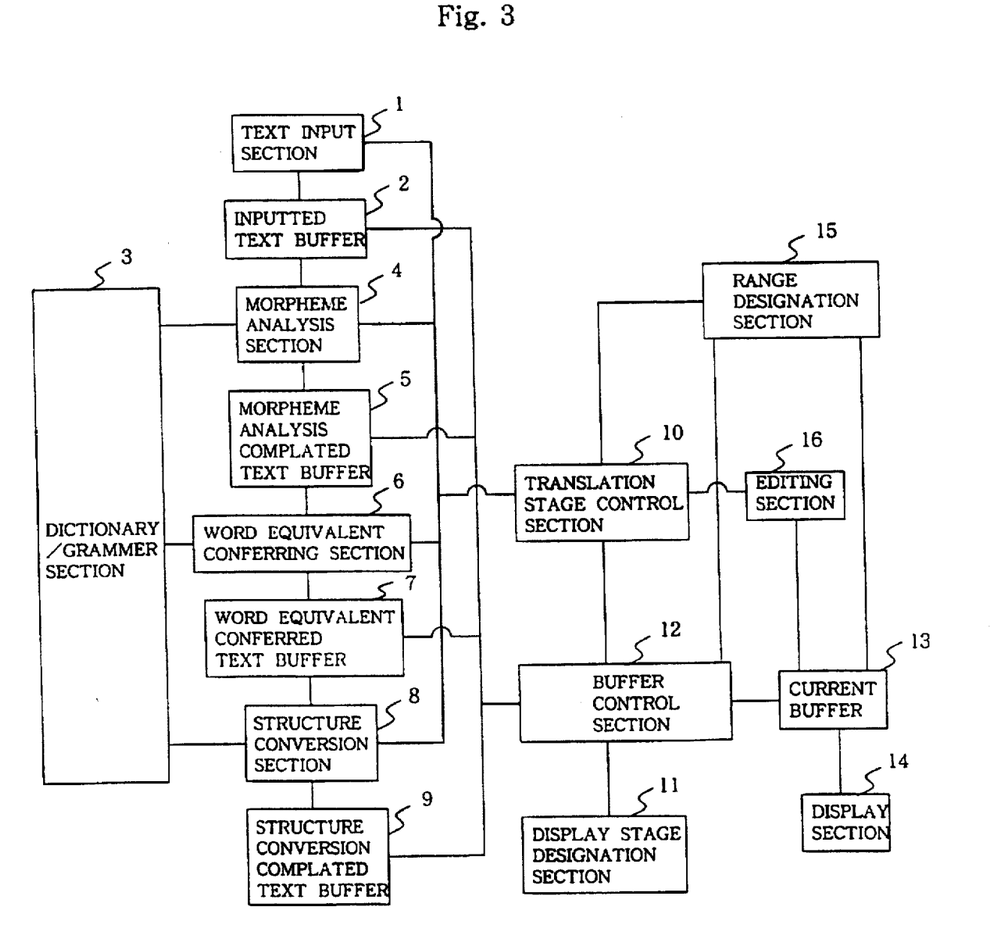
FIG. 3 is a block diagram showing the configuration of the second embodiment of the present invention.

FIG. 3 is a block diagram showing the configuration of a second embodiment of the present invention. The machine translation device of this embodiment is characterized by providing the machine translation device of the first embodiment with editing section 16. The machine translation device according to the second claim will next be explained with reference to FIG. 3.

Here, while "The president/wa/furansu/ni/it/ta/." is stored in current buffer 13, the operator instructs editing section 16 to delete "furansu" within current buffer 13 and write "itaria". Editing section 16 carries out these instructions, and as a result, "The president /wa/itaria/ni/it/ta." is held in current buffer 13.
Note: "Itaria" means "Italy" in Japanese.

Buffer control section 12 then receives an editing completed signal from editing section 16 and copies the revised content within current buffer 13 to the corresponding morphological analysis completed text buffer 5. Translation stage control section 10 also receives an editing completed signal sent from editing section 16, and instructs the corresponding translation equivalent conferring section 6 to execute processing, and "The president wa Italy ni fly ta." is obtained as a result. Thus, for any portion of any translation processing stage, the operator is not only able to refer to corresponding portions at any other translation processing stage, but can also make revisions to the text and produce text as desired in the target language.

Figure 4:
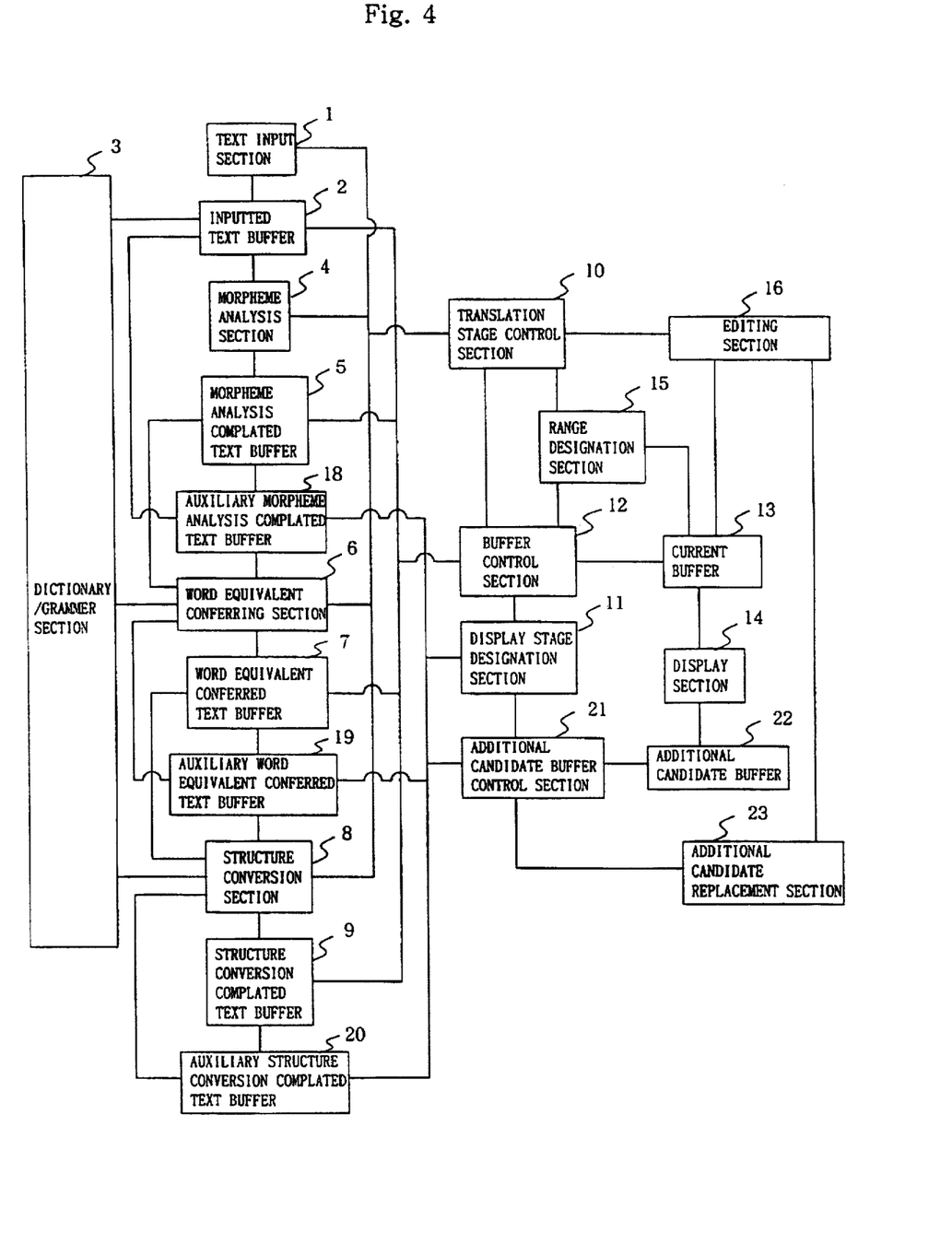
FIG. 4 is a block diagram showing the configuration of the third embodiment of the present invention.

FIG. 4 is a block diagram showing the configuration of a third embodiment of the present invention. The machine translation device of this embodiment is characterized by providing the machine translation device of the second embodiment with function word morphological analysis completed text buffer 18, function word translation equivalent conferred text buffer 19, function word structure conversion completed text buffer 20, additional candidate buffer control section 21, additional candidate buffer 22, and additional candidate replacement section 23. The embodiment of a machine translation device according to the third claim of the present invention will next be explained with reference to FIG. 4.

First, in the process of morphological analysis, morphological analysis section 4, in addition to normally outputted text, outputs to function word morphological analysis completed text buffer 18 all morphemes offered as morpheme candidates for morphemes contained within inputted text, and function word morphological analysis completed text buffer 18 receives and holds this output.

Next, in the process of conferring equivalents to content words, translation equivalent conferring section 6 also outputs, in addition to normally outputted text, all equivalents offered as candidate equivalents to function word translation equivalent conferred text buffer 19. This output is received and held by function word translation equivalent conferred text buffer 19.

Similarly, in the process of converting sentence structure, structure conversion section 8 outputs, in addition to normally outputted text, all sentence structures offered as candidate sentence structures reflected in the translated text to function word structure conversion completed text buffer 20, and this output is received and held by function word structure conversion completed text buffer 20.

When the operator sends to editing section 16 an instruction for an additional candidate selection, editing section 16 receives the instruction and sends the instruction on to additional candidate buffer control section 21. Additional candidate buffer control section 21 then refers to display stage designation section 11, identifies the translation stage designated by the operator for text display, refers to the corresponding buffer from among function word morphological analysis completed text buffer 18, function word translation equivalent conferred text buffer 19, and function word structure conversion completed text buffer 20, and outputs the content of that buffer. This output is received and held by additional candidate buffer 22 and display section 14 displays the content of additional candidate buffer 22.

When the operator sends a replace candidate instruction to additional candidate replacement section 23 to replace the text being edited with this additional candidate, additional candidate replacement section 23 receives the instruction and copies the additional candidate within additional candidate buffer 22 to current buffer 13. For example, in the process of producing an English translation of "Shachou wa furansu ni itta.", the operator instructs the temporary display of translation equivalent conferred text "The president wa France ni fly ta." The operator here designates from range designation section 15 "The president" as a range and sends an instruction for an additional candidate selection from editing section 16. This instruction is received by additional candidate buffer control section 21, which refers to display stage designation section 11 and acknowledges that the operator's designation is at the equivalent conferring translation stage and that the designated range has IDs a and b, refers to corresponding content in function word translation equivalent conferred text buffer 19 and copies and outputs this content, for example, "The head of the company". This output is then received and held by additional candidate buffer 22.

If the operator further sends a replace candidate instruction to additional candidate replacement section 23 to replace the text being edited with the candidate, additional candidate replacement section 23 receives this instruction and copies "The head of the company", the additional candidate within additional candidate buffer 22, to the position of the corresponding "The president" in current buffer 13. As a result, the content of current buffer 13 becomes "The head of the company wa France ni fly ta.". In addition, an embodiment is possible in which the operator selects an appropriate candidate from among a plurality of additional candidates that are displayed simultaneously.

Consequently, when the operator is revising text at a particular stage of translation, the operator can refer to and choose from among additional equivalent words or sentence structures that a machine translation device can provide. Accordingly, correct translations can be easily produced taking advantage of the additional equivalent words or sentence structures provided by a machine translation device.

Figure 5:
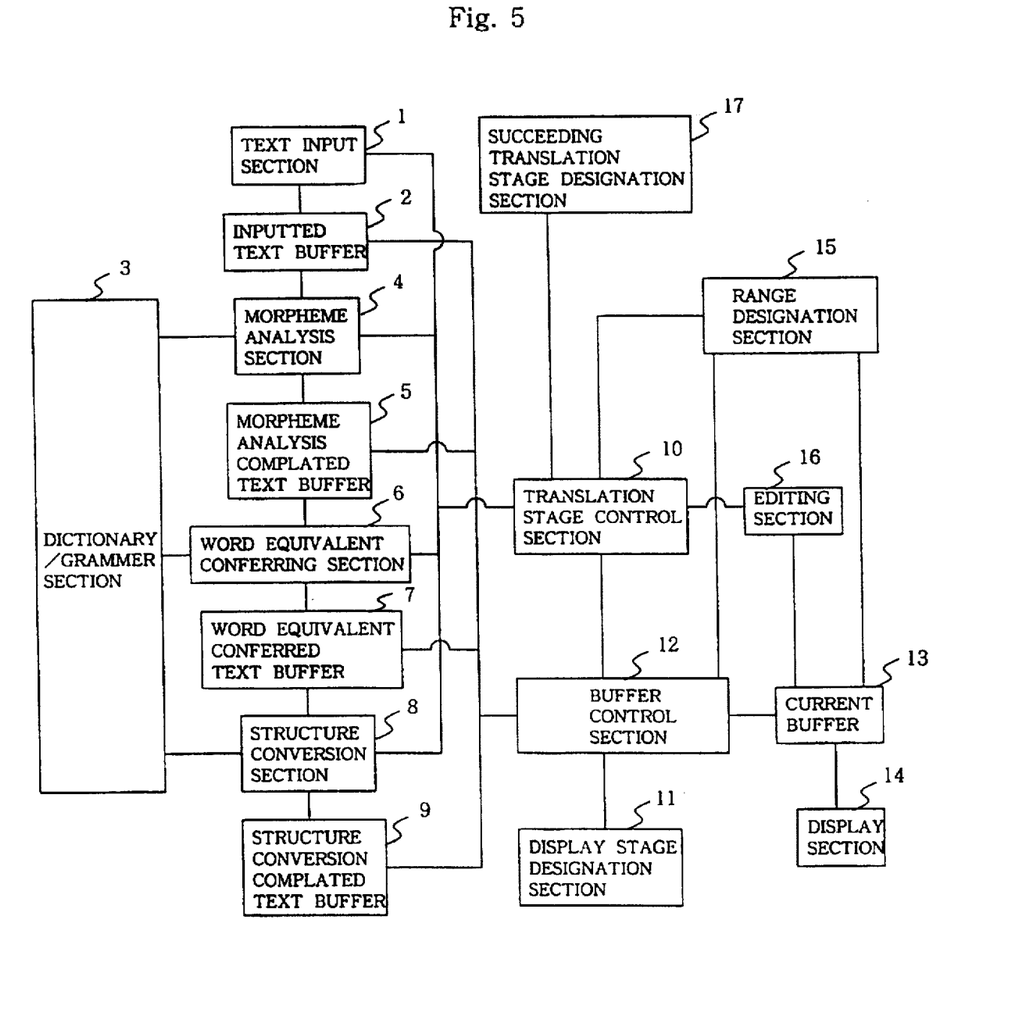
FIG. 5 is a block diagram showing the configuration of the fourth embodiment of the present invention.
Figure 6:
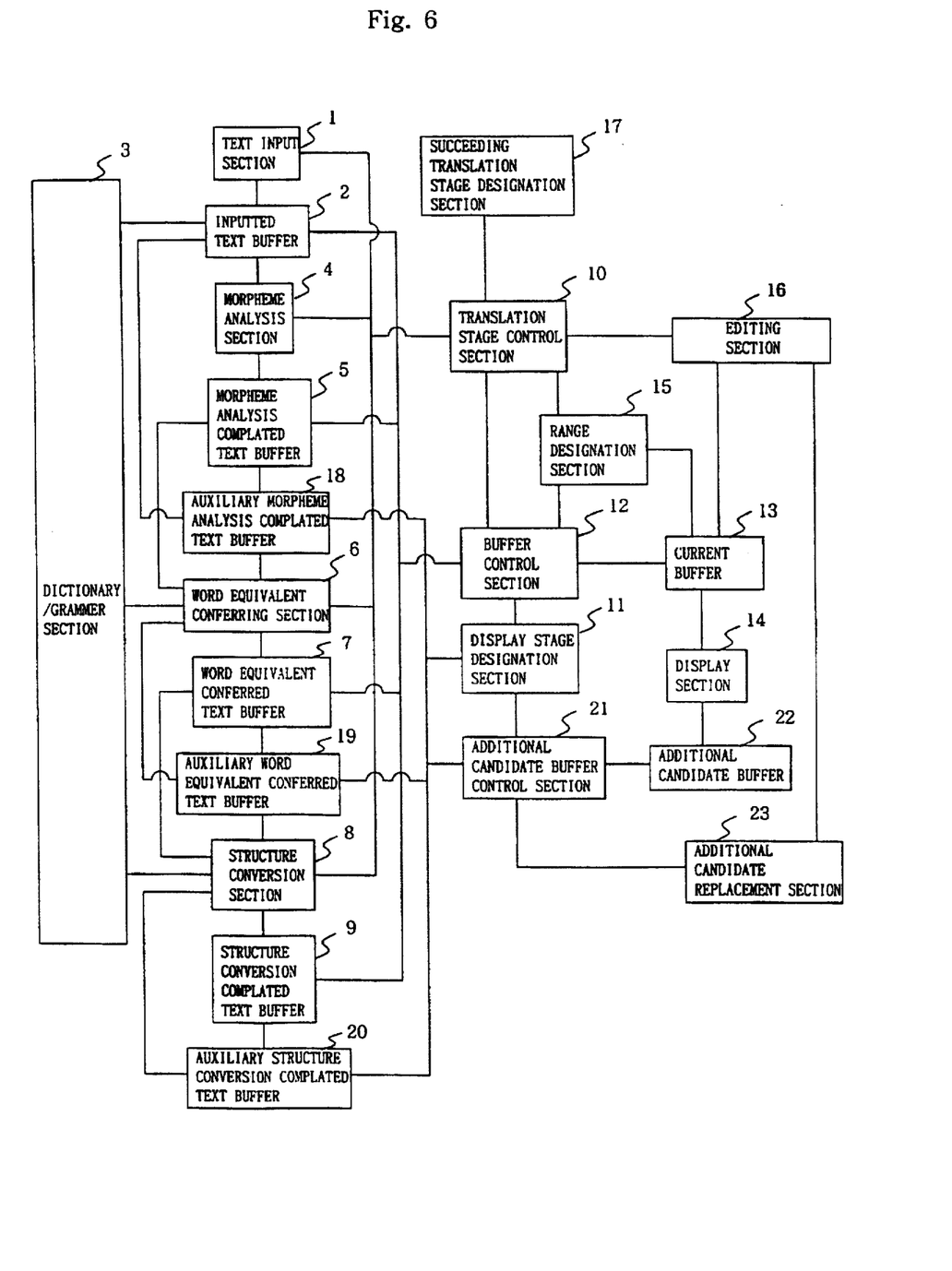
FIG. 6 is a block diagram showing the configuration of the fifth embodiment of the present invention.

FIG. 5 and FIG. 6 are block diagrams showing the configurations of a fourth and fifth embodiment of a machine translation device according to the present invention. The fourth and fifth embodiments are characterized by providing a succeeding translation stage designation section 17 to the second and third embodiments, respectively, of the present invention. These embodiments will next be explained with reference to FIG. 5.

FIG. 5 shows the second embodiment of the present invention to which has been added succeeding translation stage designation section 17.

Upon reception of an input completed signal from text input section 1, morphological analysis section 4, translation equivalent conferring section 6, or structure conversion section 8, translation stage control section 10 refers to succeeding translation stage designation section 17. Then, when the operator checks corresponding inputted text, morphological analysis completed text, translation equivalent conferred text, or structure conversion completed text at display section 14, the operator inputs an instruction to the succeeding translation stage designation section 17 to execute the translation process of the next stage, and this instruction is received at succeeding translation stage designation section 17. Translation stage control section 10, while referring to succeeding translation stage designation section 17, refers to this instruction and sends an instruction to execute processing to the processor performing the next translation process, for example, sending to morphological analysis section 4 if text input is completed or sending to translation equivalent conferring section 6 if morphological analysis is completed. In this way, the operator is able to proceed with the translation process interactively, checking and closely monitoring the results of each translation process.

FIG. 6 shows a machine translation device according to the third embodiment of the present invention to which has been added succeeding translation stage designation section 17. With this device, revisions can be made interactively at every stage of translation using additional candidates selected by the operator, and revisions can be made only when necessary.

Moreover, although each of the above-described embodiments have been described only with respect to translating from Japanese into English, the configuration of the present invention is not limited by language, and can for example be applied to converting English to Japanese, and is of course applicable to translation between other languages.

As explained hereinabove, according to the present invention, an operator is able to refer to text which has undergone translation processing to any stage; for example, inputted text, the results of morphological analysis of inputted text, the results of replacing only content words with target language equivalents while maintaining the sentence structure of the original language, or translated text converted to the sentence structure of the target language while dropping auxiliaries; and the operator is able to edit particular portions of the text while referring to corresponding portions at other stages of translation processing without affecting other portions of the text.

In this way, even operators without specialized knowledge are able to easily grasp the processing carried out at each stage of translation using familiar and natural language expressions which do not greatly differ from the inputted text. Furthermore, the appropriateness of processing can be judged while focusing on only one process at a time among any of morphological analysis, translation equivalent conferring, or sentence structure conversion. In addition, the translation results brought about by selecting additional candidates or adding the operator's own revisions at any stage can then be easily monitored.

Finally, because a succeeding process can be carried out after correcting a process error at an intermediate stage of translation, process errors brought about by errors in processing at an earlier stage of translation can be prevented from occurring. The editing process can further be facilitated by allowing the operator to focus on a word, phrase, clause, sentence or any single portion of text at any stage of translation or allowing the operator to take full advantage of additional equivalent words or sentence structures held by the machine translation device.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A machine translation device comprising:

a text input section that receives text inputted by an operator, assigns an ID to each character of text, outputs a text result, and sends an input process completed signal;

an input text buffer that stores the text result;

a dictionary/grammar section comprising a language dictionary and a grammar dictionary;

a morphological analysis section, that refers to said dictionary/grammar section and copies the text result stored by said input text buffer, carries out morphological analysis on said text result while assigning each ID to one of corresponding morphemes, outputs a morphological result, and sends a morphological analysis process completed signal;

a morphological analysis completed text buffer that stores the morphological result;

a translation equivalent conferring section, that refers to said dictionary/grammar section, copies the morphological result stored by said morphological analysis completed text buffer, replaces each morpheme in said morphological result with a target language equivalent when the morpheme is a content word while re-assigning each corresponding ID to the target language equivalent, outputs a translation equivalent result, and sends a translation equivalent process completed signal;

a translation equivalent conferred text buffer that stores the translation equivalent result;

a structure conversion section, that refers to said dictionary/grammar section, copies the translation equivalent result stored by said translation equivalent conferred text buffer, replaces each morpheme in said translation equivalent result with an auxiliary target language equivalent when the morpheme is an auxiliary having independent target language equivalents while re-assigning each corresponding ID to the auxiliary target language equivalent, drops each morpheme in said translation equivalent result when the morpheme lacks independent target language equivalents while re-assigning each corresponding ID to one of the target language equivalent and the auxiliary target language equivalent, converts whole target language sentences to a target language sentence structure, outputs a structure conversion result, and sends a structure conversion process completed signal;

a structure conversion completed text buffer that stores the structure conversion;

a translation stage control section that receives the input process completed signal, the morphological analysis process completed signal, the translation equivalent process completed signal, and the structure conversion process completed signal, identifies a translation stage the text has reached among said text input section, said morphological analysis section, said translation equivalent conferring section, and said structure conversion section, and sends an instruction to execute processing to a succeeding translation stage processor;

a display stage designation section that accepts the operator's designations for which translation stage is to be displayed;

a current buffer that receives and holds partially processed text;

a display section that displays the partially processed text of said current buffer;

a range designation section, that accepts the operator's designation of a range A of the partially processed text in said current buffer as well as an instruction for partial processing of said range A; and a buffer control section, that refers to said translation stage control section and said display stage designation section, copies to said current buffer either (i) a most recent translation stage or (ii) the translation stage designated by the operator wherein the translation stage has been completed, consults each ID associated with range A of said current buffer designated by the operator in said range designation section, and searches for a range B having each identical ID as range A from the translation stage designated in said display stage designation section, and copies range B over range A.

2. A machine translation device according to claim 1, further comprising:

an editing section, that executes the operator's editing instructions with respect to said current buffer and sends an operator's editing completed signal;

wherein said buffer control section receives said operator's editing completed signal from said editing section and copies said current buffer to a source buffer of said current buffer; and wherein said translation stage control section receives the operator's editing completed signal from said editing section, and sends the instruction to execute processing to the succeeding translation stage.

3. A machine translation device according to claim 2, wherein:

said morphological analysis section, in the process of carrying out morphological analysis, assigns IDs of corresponding characters to all morphemes offered as candidates of morphemes within the inputted text, and outputs all candidates in addition to the morphological result;

a function word morphological analysis completed text buffer is provided that receives and holds candidates outputted by said morphological analysis section;

said translation equivalent conferring section, in the process of conferring equivalent words to content words, outputs all equivalent words offered as candidate translation equivalents in addition to the translation equivalent result and assigns the equivalent IDs accompanying morphemes to the equivalent words;

a function word translation equivalent conferred text buffer is provided that receives and holds candidates outputted by said translation equivalent conferring section;

said structure conversion section, in the process of converting sentence structure, assigns IDs of corresponding morphemes and equivalent words to all sentence structures offered as candidates to be reflected in translated text and outputs the candidates in addition to structure conversion;

a function word structure conversion completed text buffer is provided that receives and holds candidates outputted by said structure conversion section;

said editing section receives a select additional candidate instruction from the operator and sends the select additional candidate instruction;

said machine translation device receives the select additional candidate instruction from the operator, and instructs candidate replacement of the content of said current buffer in accordance with said select additional candidate instruction;

an additional candidate buffer control section is provided that receives the select additional candidate instruction sent by said editing section, refers to said display stage designation section, refers to said function word morphological analysis completed text buffer, said function word translation equivalent conferred text buffer, or said function word structure conversion completed text buffer that holds a candidate for a display stage designated by the operator, and copies and outputs the content of one of said buffers;

an additional candidate buffer is provided that receives and holds the output of said additional candidate buffer control section;

said display section displays the content of said additional candidate buffer; and an additional candidate replacement section is provided that receives an instruction for candidate replacement by an additional candidate instructed by said editing section, and replaces text within said current buffer with said additional candidate.

4. A machine translation device according to claim 2, further comprising:

a succeeding translation stage designation section that receives an instruction for a succeeding translation process from the operator; and wherein said translation stage control section refers to the instruction of said succeeding translation stage designation section and then sends the instruction to execute processing to each translation section.

5. A machine translation device according to claim 3, further comprising:

a succeeding translation stage designation section that receives an instruction for a succeeding translation process from the operator; and wherein said translation stage control section refers to the instruction of said succeeding translation stage designation section and then sends the instruction to execute processing to each translation section.

* * * * *